United States Patent
Eytchison et al.

(10) Patent No.: US 7,412,538 B1
(45) Date of Patent: Aug. 12, 2008

(54) REQUEST EVENT MANAGER AND EVENT LISTS FOR HOME AND OFFICE SYSTEMS AND NETWORKS

(75) Inventors: Edward B. Eytchison, Milpitas, CA (US); Shiva Patibanda, Fremont, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 957 days.

(21) Appl. No.: 09/594,227

(22) Filed: Jun. 14, 2000

Related U.S. Application Data

(63) Continuation-in-part of application No. 09/476,419, filed on Dec. 30, 1999, now abandoned, and a continuation-in-part of application No. 09/281,636, filed on Mar. 30, 1999, now Pat. No. 6,363,434.

(51) Int. Cl.
*G06F 15/16* (2006.01)
(52) U.S. Cl. .................. 709/245; 709/227; 370/352
(58) Field of Classification Search ............... 725/105, 725/95, 119, 129, 133, 78, 58, 40, 60, 61, 725/87, 74, 80, 82, 141, 153; 709/203, 208, 709/230, 218, 219, 223, 220, 217, 227, 226, 709/314–316, 313, 312; 710/10, 117, 107, 710/67; 370/439, 437, 443, 352, 466, 487, 370/467, 401, 232, 465, 332; 348/552; 707/10, 707/104.1, 102; 705/7–8; 718/101–104
See application file for complete search history.

(56) References Cited

U.S. PATENT DOCUMENTS

| | | | |
|---|---|---|---|
| 6,243,707 B1 * | 6/2001 | Humpleman et al. ........ | 707/102 |
| 6,330,572 B1 * | 12/2001 | Sitka ........................... | 707/205 |
| 6,343,299 B1 * | 1/2002 | Huang et al. ................. | 707/203 |
| 6,466,971 B1 * | 10/2002 | Humpleman et al. ........ | 709/220 |
| 6,523,696 B1 * | 2/2003 | Saito et al. ................... | 709/223 |
| 6,567,807 B1 * | 5/2003 | Robles et al. ................. | 707/10 |
| 6,580,950 B1 * | 6/2003 | Johnson et al. ............... | 700/17 |
| 6,658,512 B1 * | 12/2003 | Gokulrangan ............... | 710/117 |
| 6,848,104 B1 * | 1/2005 | Van Ee et al. ............... | 719/310 |
| 2004/0070594 A1 * | 4/2004 | Burke ......................... | 345/716 |
| 2006/0161956 A1 * | 7/2006 | Wasilewski et al. ........... | 725/58 |

* cited by examiner

*Primary Examiner*—Edan Orgad
*Assistant Examiner*—Chuong Ho

(57) ABSTRACT

A request event manager for a network of consumer electronic devices. In one embodiment, the request event manager maintains a database of home network services, and allows the home network services to be scheduled for execution over time. Home network services herein refer to high-level abstractions of a consumer electronic device's functionalities, and also content that is available from the consumer electronic device. The request event manager of the present invention also creates and maintains a service request list (SRL) which details the service actions in a hierarchical fashion. By maintaining a database of home network services, the request event manager of the present invention allows user applications to specify and schedule concatenated or hierarchical events such that different network activity across interconnected heterogeneous consumer electronic devices can be synchronized without requiring complicated logic to be implemented. The request event manager of the present invention may be implemented as part of a middleware infrastructure for a home network, and may reside within a home server.

18 Claims, 11 Drawing Sheets

REQUEST EVENT MANAGER AND EVENT LISTS FOR HOME AND OFFICE SYSTEMS AND NETWORKS

RELATED CASES

This is a continuation-in-part of U.S. patent application Ser. No. 09/476,419, filed on Dec. 30, 1999, and entitled "A RESOURCE MANAGER FOR PROVIDING USER-DEPENDENT ACCESS CONTROL FOR A NETWORK OF CONSUMER ELECTRONIC DEVICES". This is also a continuation-in-part of U.S. patent application Ser. No. 09/281,636, filed on Mar. 30, 1999, and entitled "METHOD OF MANAGING RESOURCES WITHIN A NETWORK OF CONSUMER ELECTRONIC DEVICES".

FIELD OF THE INVENTION

The present invention pertains generally to the field of consumer electronic devices. More specifically, the present invention pertains to the field of networked consumer electronic media devices.

BACKGROUND OF THE INVENTION

A entertainment system typically includes a number of consumer electronic media devices such as televisions, compact disc (CD) players, tuners, digital video disc (DVD) players, a video cassette recorders (VCRs) and high-fidelity speakers. Many sets of wires are usually required to connect these components together to provide the desired functionality. For example, a wire is required for connecting the DVD player to the TV and another wire is required for connecting the DVD player to the tuner. Yet another wire is required for connecting the tuner to the speakers. Most of these devices only have a limited number of inputs and outputs for connecting to other devices. Thus, it is not surprising that most entertainment systems include only a handful of different devices.

Recently, a class of consumer electronic media devices has been introduced that can be networked together using a standard communication protocol layer (e.g., IEEE 1394 communication standard). The IEEE 1394 standard is an international standard for implementing an inexpensive high-speed serial bus architecture which supports both asynchronous and isochronous format data transfers. The IEEE 1394 standard provides a high-speed serial bus for interconnecting digital devices thereby providing universal input/output connection. The IEEE 1394 standard defines a digital interface for applications thereby eliminating the need for an application to convert digital data to an analog form before it is transmitted across the bus. Correspondingly, a receiving application will receive digital data from the bus, not analog data, and will therefore not be required to convert analog data to digital form. The IEEE 1394 standard is ideal for consumer electronics communication in part because devices can be added to or removed from the serial bus while the bus is active. If a device is so added or removed, the bus automatically reconfigures itself for transmitting data between the then existing devices. Each device on the bus is a "node" and contains its own address space.

The provision of the IEEE 1394 serial communication bus for networking consumer electronic devices has allowed the development of an entertainment network that consists of a large number of consumer electronic devices. In addition, the provision of the IEEE 1394 serial bus enables a single source device to provide content to multiple destination devices. For example, a DVD player located in the living room can be shared by multiple TV sets located in the bedrooms and in the kitchen. However, one problem associated with sharing source devices within the entertainment network is that multiple users may want to use the same source devices at the same time. Therefore, it would be advantageous to provide an access control system that allocates control of the devices intelligently.

Another problem associated with such an entertainment network is bandwidth contention. For example, if many TV sets and DVD players are connected to the home network, the IEEE 1394 serial bus may not have sufficient bandwidth to support multiple simultaneous isochronous channels for multiple video streams. Therefore, it would be advantageous to provide a method of managing a network of consumer electronic media devices. It would also be advantageous to provide a method of managing resources within a network of consumer electronic media devices such that the problem of bandwidth contention is addressed.

Yet another problem associated with an entertainment network is that, because content-containing media (e.g., CDs, DVDs) are distributed across the network, it is burdensome for a user to locate the desired content. For example, a home entertainment network may include several DVD players and DVD jukeboxes each capable of holding hundreds of DVDs. It would be difficult for a user to browse through every devices to locate the desired DVD. Therefore, it would be advantageous to provide a method of managing resources within the home network such that complicated management and control of the devices are hidden from the users.

Another problem associated with the entertainment network is that, when connected to the Internet, the consumer electronic devices and information contained therein may become compromised due to unauthorized access from third party users (e.g., hackers). Therefore, it would be advantageous to provide a method of managing resources within the home network such that the devices are protected from misuse and unauthorized accesses.

Still another problem associated with a network of consumer electronic devices is that there is no support for home-network applications when it comes to synchronizing different network activity across heterogeneous consumer electronic devices. For example, if an application wants to tune the cable set top box (STB) to channel 12 at 4:59 pm everyday, record a TV show at 5:00 pm everyday, rewind the VCR tape at 6:05 pm everyday, eject the tape from the VCR at 6:10 pm, then power off the VCR unit at 6:15 pm everyday, and forward all telephone calls between 9:00 am-4:00 pm everyday, the application would have to develop complicated logic to perform these tasks. If a user varied his schedule the application logic would have to be modified to reflect the needs of the user. This would complicate the application and limit the flexibility of home networking applications. Moreover, before the home-network applications schedule and executes any service, they have to know all the specific APIs (Application Programming Interfaces) and dependencies for each consumer electronic device on the home network. If a new consumer electronic device with different methods is installed on the network and the consumer electronic device offers similar or identical features to existing devices on the network, the application would have to be re-architectured. Therefore, there is a need for a method and system that allows home network applications to be easily and conveniently programmed to synchronize activities of heterogeneous consumer electronic devices of a network.

SUMMARY OF THE DISCLOSURE

Accordingly, the present invention provides a request event manager for a network of consumer electronic devices. In one embodiment, the request event manager maintains a database of home network services, and allows the home network services to be scheduled for execution over time. Home network services herein refer to high-level abstractions of a consumer electronic device's functionalities, and also content that is available to the network of consumer electronic devices. The request event manager of the present invention may be implemented as part of a middleware infrastructure for a home network, and may reside within a home server.

According to one embodiment of the present invention, the request event manager creates and maintains a service request list (SRL) which details the service actions in a hierarchical fashion. By maintaining a database of home network services, the request event manager of the present invention allows user applications to specify and schedule concatenated or hierarchical events such that different network activity across interconnected heterogeneous consumer electronic devices can be synchronized without requiring complicated logic to be implemented.

In the present embodiment, the request event manager maintains a network service database that contains all the service offerings of all the devices of the network of consumer electronic devices. The service offerings represent the aggregate capabilities of the entire network of consumer electronic devices, and are not necessarily device specific or source specific. A home network application program implemented on top of the request event manager platform of the present invention may query the request event manager to list the available service listings. However, the home network application program may not know about the individual devices of the home network. In essence, the devices of the network are concealed by the request event manager. Only the functionalities of the devices are presented to the home network application.

The request event manager of the present invention also provides methods that allow home network applications to construct and modify service request lists. According to the present invention, service request lists contain details of the source device(s) and destination device(s) along with the control and timing information that are necessary for carrying out the requested event. The service request lists may also contain information that describes how the content is to be played back, special play attributes (e.g., video fade, scroll, overlay, etc.). Also contained in a service request list may be routing information that allows the source device(s) to be routed to the destination device(s). In the present embodiment, service request lists are created by home application programs using the request event manager's API (application programming interface) calls.

In furtherance of the present invention, service request lists are hierarchical data structures with the top level containing the "event name" and the lowest level containing all the device's specific commands necessary to carry out the requested service. Particularly, in one embodiment, the top level of the service event list is called the Service level, and the next level down is called the Component level. Below the Component level are Unit level and Sub-unit levels. The Service level contains a handle for accessing the request list and description information as well as timing information. The Component level high-level commands can be issued for individual components. Individual component commands are issued at the Unit level. Finally, at the sub-unit level, more detailed commands are defined. Depending on the level of complexity of the devices of the network, the service request lists can be expanded into more layers.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

In the following detailed description of the preferred embodiments, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

I. Computer System Environment of the Present Invention

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "collecting", "computing", "determining", "grouping", "mapping", "assigning" or the like, refer to the actions and processes of a computer system, or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Figure 1:
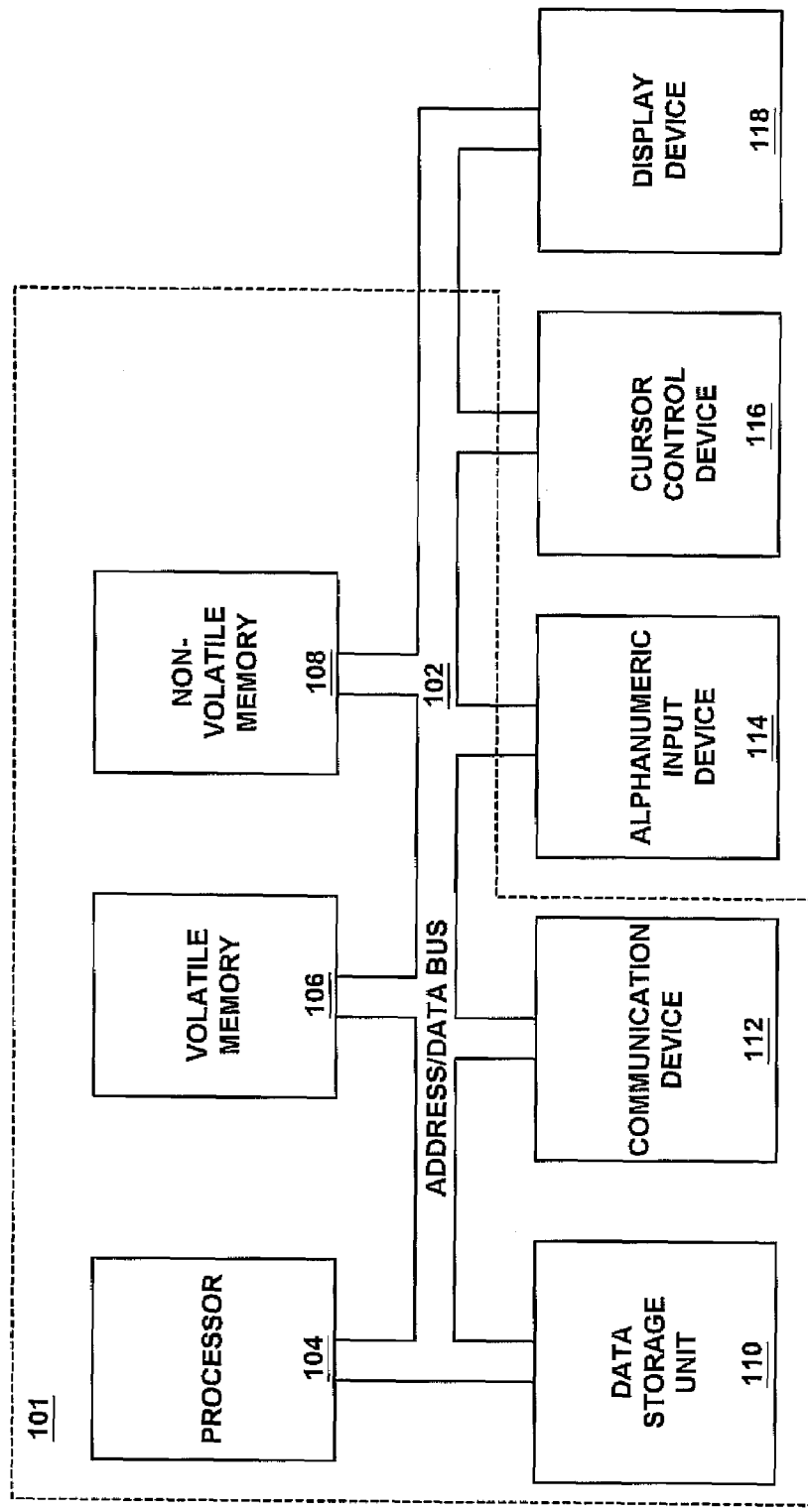
FIG. 1 is a block diagram illustrating components of a home server in accordance with the present invention.

Specific aspects of the present invention are operable within a server system (e.g., a home server system). In general, a home server (or other intelligent electronic device such as a set-top-box) for the home entertainment network in accordance with the present invention includes a general purpose computer system 101 operable as a platform to implement and support elements of the present invention. As shown in FIG. 1, computer system 101 includes an address/data bus 102 for communicating information including address, data, and control signals, a central processor 104 coupled with bus 102 for processing information and instructions, a volatile memory 106 (e.g., random access memory RAM) coupled with the bus 102 for storing information and instructions for the central processor 104 and a non-volatile memory 108 (e.g., read only memory ROM) coupled with the bus 102 for storing static information and instructions for the processor 104, a data storage device 110 such as a magnetic or optical disk and disk drive coupled with the bus 102 for storing information and instructions, an optional display device 118 coupled to the bus 102 for displaying information to the computer user, an optional alphanumeric input device 114 including alphanumeric and function keys coupled to the bus 102 for communicating information and command selections to the central processor 104, an optional cursor control or directing device 116 coupled to the bus 102 for communicating user input information and command selections to the central processor 104, and a communication device 112 coupled to the bus 102 for communicating signals that are input and output from the system 101. The communication device 112 is configured for connecting to a home entertainment network via an IEEE 1394 serial communication bus 215. Computer 101 may further include another communication device (e.g., a modem) for connecting the home network to the Internet.

Program instructions executed by the home server 101 can be stored in computer usable memory units such as RAM 106, ROM 108, or in the storage device 110, and when executed in a group can be referred to as logic blocks or procedures. It is appreciated that data produced at the various stages of the present invention, including path availability information and resource availability information, can also be stored in RAM 106, ROM 108 or the storage device 110 as shown in FIG. 1.

The display device 118 of FIG. 1 utilized with the computer system 101 of the present invention is optional and may be a flat panel liquid crystal display (LCD) device, a TV, a personal digital assistant (PDA) or other display device suitable for creating graphic images and alphanumeric characters recognizable to the user. The cursor control device 116 allows the computer user to dynamically signal the two dimensional movement of a visible pointer on a display screen of the display device 118. Many implementations of the cursor control device are known in the art including a trackball, mouse, joystick or special keys on the alphanumeric input device 114 capable of signaling movement of a given direction or manner of displacement.

II. Network Environment in Accordance with the Present Invention

Figure 2:
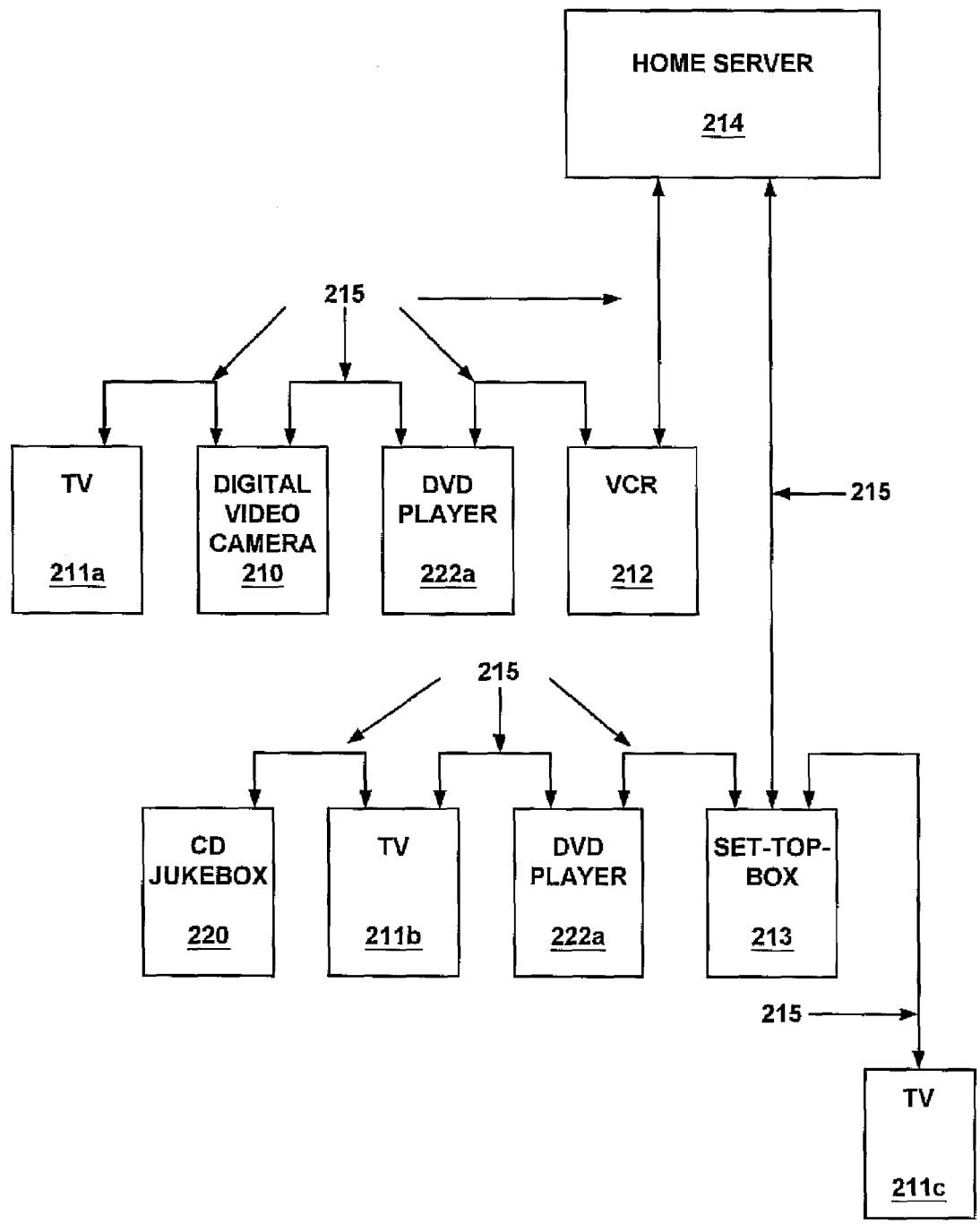
FIG. 2 illustrates an exemplary entertainment network in which embodiments of the present invention may be practiced.

FIG. 2 illustrates an exemplary home entertainment network 200 in which the present invention may be practiced. Exemplary network 200 includes consumer electronic media devices (including computer systems) as nodes but could be extended equally well to cover other electronic devices. Exemplary network 200 includes a digital video camera 210, a video cassette recorder (VCR) 212, a home server 214, a set-top-box 213, television sets (TVs) 211a-211c, a compact disc (CD) jukebox 220 and DVD players 222a-222b connected together by IEEE 1394-1995 (IEEE 1394) bus 215. The set-top-box 213 can be coupled to receive media from a cable TV system. The IEEE 1394 bus lines, or "cables," allow the consumer electronic media devices to transmit data, commands and parameters to other devices of the network 200.

It should be noted that home network 200 illustrated in FIG. 2 is exemplary only and that a home network in accordance with the present invention could include many different combinations of components. It should also be appreciated that consumer electronic devices of the network 200 may be accessed via user applications such as a web-browser.

The IEEE 1394 communication standard within network 200 of FIG. 2 supports isochronous data transfers of digital encoded information. Isochronous data transfers are real-time transfers which take place such that the time intervals between significant instances have the same duration at both the transmitting and receiving applications. Each packet of data transferred isochronously is transferred in its own time period. An example of a "real-time" application for the transfer of data isochronously is from VCR 212 to TV 211a of FIG. 2. The VCR 212 records images and sounds and saves the data in discrete packets. The VCR 212 then transfers each packet, representing the images and sounds recorded over a limited time period, during that time period, for display by the TV 211a. The IEEE 1394 standard bus architecture provides multiple channels for isochronous data transfers between applications. Specifically, a six bit channel number is broadcast with the data to ensure reception by the appropriate application. This feature of the IEEE 1394 bus allows multiple devices to simultaneously transmit isochronous data across the bus structure. This feature also enables media (e.g., CDs, DVDs, video cassettes, etc.) to be distributed across the home network 200. Further, this feature enables the devices of the home entertainment network 200 to be distributed across the home.

III. Resource Manager

In conventional home networks, users are presented with a "device-centric" view of the network. That is, users of conventional home networks are given a list of devices in the network, and the users must individually control each electronic devices in the network to get the desired functionality. For example, a user desiring to play a DVD must first select the DVD player from a user-interface of the home network system and then selects a "play" button. Such a "device-centric" view of the home network can be cumbersome and complicated for the users if a large number of devices are connected to the home network. The resource manager of the present invention provides a solution to this problem by enabling the home network to present to the users a "content-centric" view, or "service-centric" view, of the network. In accordance with the present invention, when presented with a "content-centric" view or "service-centric" view, users can select the content or service available from the network without regard to the devices that contain and provide the service.

In accordance with the present invention, audio/visual (A/V) streams, movies stored on DVDs (or VCDs, etc.), sound tracks stored on CDs, web-pages, etc., that are accessible by a home network (e.g., network 200) are considered "contents". "Services" herein refer to systems and methods of providing the users of the home network with the content accessible by the network and use of the devices of the network. For example, a service provided by the home server may be the delivery of a movie to a particular room in the house. As another example, if a user requests a movie to be played at the family room, then the "content" in this case would be the A/V streams of the movie stored within a DVD jukebox coupled to the home network, and the "service" would be the delivery of the A/V streams to the family room. The resource manager of the present invention manages the resources underlying the service delivery operations such that services can be performed with minimal user control, significantly improving the ease-of-use of home audio-visual devices. The resource manager of the present invention also determines whether a service will be provided to a particular user (e.g., authorized user) with a policy-checking mechanism.

Figure 7:
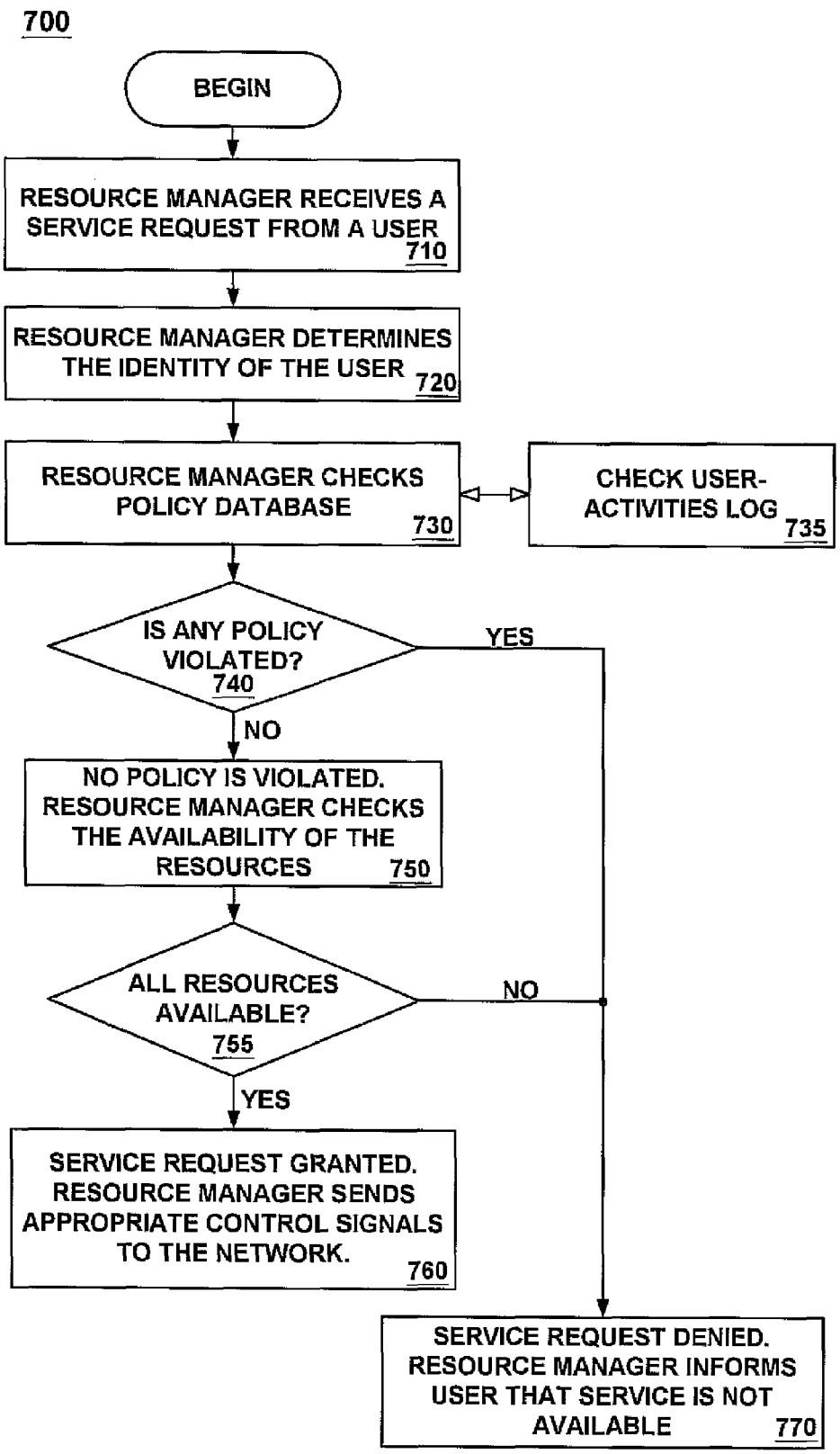
FIG. 7 is a flow diagram illustrating a process of managing resources within a home network in accordance with an embodiment of the present invention.

FIG. 7 is a flow chart diagram illustrating a process 700 of managing resources within a home network in accordance with an embodiment of the present invention. In the present embodiment, users of the home network are not presented with information regarding the devices of the home network. That is, users are not presented with a "device-centric" view of the home network. Rather, users are presented with a "content-centric" or "service-centric" view of the network. Significantly, users do not control the devices directly to achieve the desired goals. Rather, the users request "services" to be performed by the home network. The requests may be granted or denied depending upon the identity of the user, the associated access policies and the availability of resources.

As illustrated in FIG. 7, at step 710, the resource manager receives a service-based request from a user. For example, a service-based request may be "play a movie M at the family room." In the present embodiment, users may explicitly indicate the location where the services are to be delivered. If the location is not explicitly indicated by the users, the location can be inferred from the location where the request is made.

At step 720, the resource manager determines the identity of the user making the service-based request. In the present embodiment, the identify of a user can be ascertained by requiring the user to go through a user authentication process (e.g., a "log in" process) before the user is permitted to make a request for selected services. Any number of well known user authentication processes can be used in accordance with the present invention.

At step 730, the resource manager checks a database of pre-programmed and pre-determined policy statements, and at step 740, determines whether any policy statements are violated by the service-based request. An example of a policy statement would be "user A can only watch G-rated movies." Thus, in this example, if the movie M is an "R-rated" movie and if user A is the user making the request, the policy statement would be violated.

The resource manager may also perform a step 735 of checking a user-activities record to determine whether any policy statements are violated. An example is that the policy may be "user X may watch Y hours of TV per day." In this example, the resource manager accesses the user-activities record and determines whether user X has watched more than Y hours of TV that day.

If it is determined that one or more policy statements are violated by the service-based request, the resource manager denies the request and informs the user that the requested service is not permitted at step 770.

At step 750, if it is determined that the requested service does not conflict with any policy statements, the resource manager checks the availability of the resources that are necessary for bringing about the requested services. For example, if a DVD-player is needed for performing the requested service, then the resource manager will check whether the DVD-player is in use.

At step 755, the resource manager determines whether the resources needed for carrying out the requested service are available. It is important to note that, in accordance with the present embodiment, network bandwidth is a resource that is considered.

At step 760, if it is determined that the resources are available, the resource manager will send appropriate control signals to the devices (or device proxies) such that the requested service can be performed.

At step 770, if it is determined that some or all of the resources are already in use, the resource manager denies the request and informs the user that the requested service is not available. It should be noted that, if the incoming request has a higher priority than the request that is currently occupying a resource, then the resource manager grants the high priority request and terminates the service that is currently provided for the low priority request.

Figure 8:
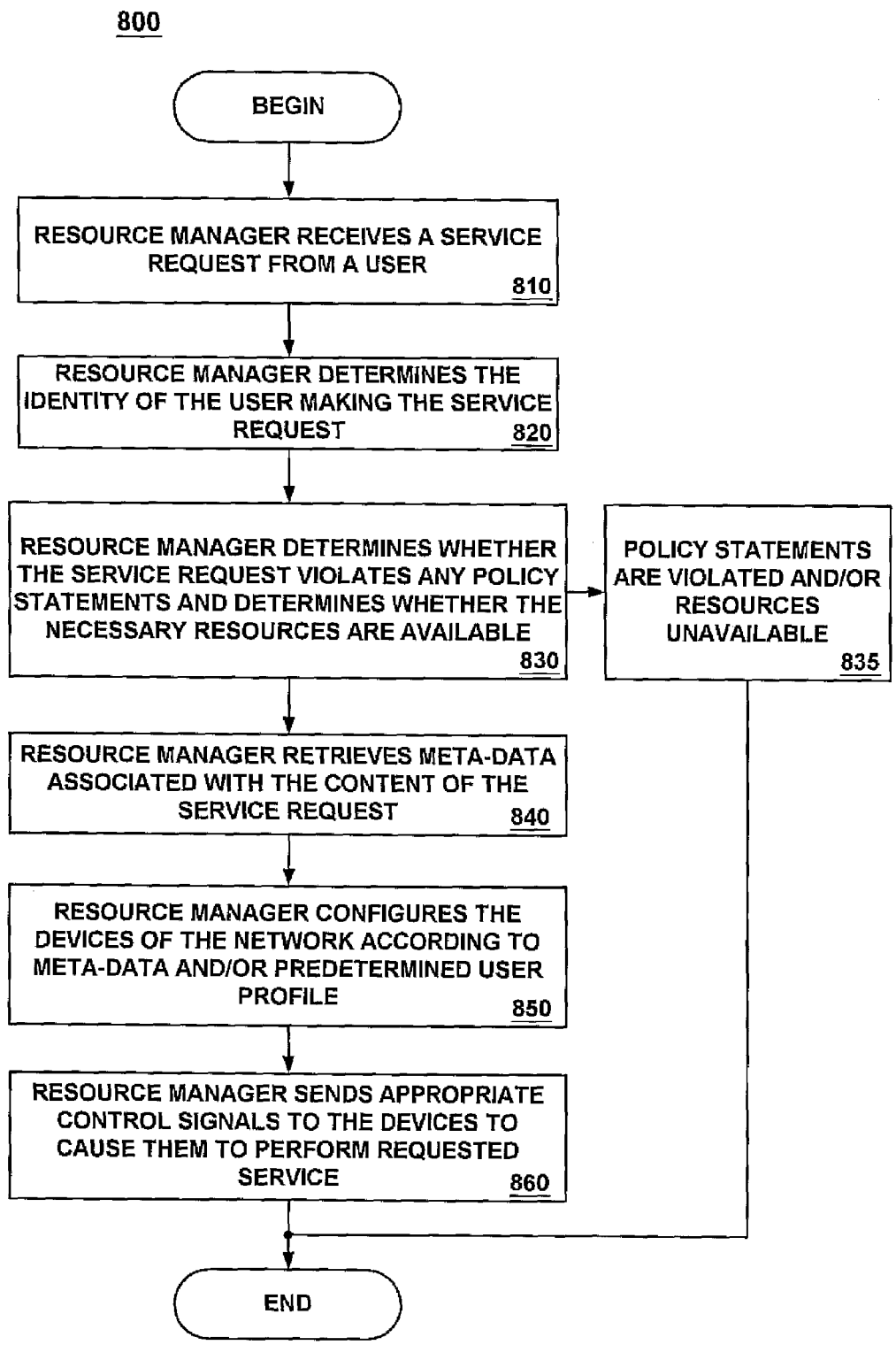
FIG. 8 is a flow diagram illustrating a process of configuring devices of a home network with meta-information in accordance with another embodiment of the present invention.

FIG. 8 is a flow diagram illustrating another embodiment of the present invention. According to the present embodiment, the resource manager of the present invention may perform additional functions not specifically requested by the user. For example, the resource manager may determine that a certain movie may be best viewed when surround sound effects are turned on. Such preference information may be stored as meta-data of the content. The resource manager of the present invention, upon detecting such information, may automatically turn on surround sound effects of the output devices at the location where the services are rendered.

As illustrated, at step 810, the resource manager receives a service-based request from a user. As an example, the service-based request may be "play a movie M in the family room."

At step 820, the resource manager determines the identity of the user making the request. In the present embodiment, the identify of a user can be ascertained by requiring the user to perform a user authentication process (e.g., a "log in" process) before the user is permitted to make a request for services. user authentication processes are well known in the art, and are therefore not described in detail herein to avoid obscuring aspects of the present invention. The resource manager also retrieves preference information associated with the user.

At step 830, the resource manager determines whether the service-based request violates any policy statements and also determines whether the requisite resources are available. If it is determined that the services requested are not permissible and/or unavailable, the resource manager may refuse to provide the service to the user at step 835, and the process 800 ends.

At step 840, if it is determined the services requested are permissible and available, the resource manager retrieves meta-data associated with the content of the requested service. An example of meta-data of a movie may be the rating information, or the identity of the director of the movie, etc. The meta-data may also include information regarding the optimum device configuration for the content. For example, the meta-data of a movie may indicate that the movie is best viewed when surround sound is turned on.

Another example of metadata may be the available camera shots at a football game. For example, one camera may be focusing on the quarterback, another camera may be focusing on the receiver and yet another camera may be focusing on the cheerleaders. The resource manager may, based on pre-defined user preferences, show only the camera feeds that are focusing on the quarterback on the TV. In one embodiment, the resource manager may show both camera feeds focusing on the quarterback and the receiver on a split screen if the predefined user preferences indicate that these camera shots are preferredly shown on the TV during a football game.

At step 850, the resource manager configures the devices of the network according to the meta-data associated with the requested service. Step 850 includes the step of sending appropriate control signals to the devices (or device proxies) of the home network. In the example of the split screen football game, the resource manager will set up the TV to play the football game in a split screen mode—one screen for the quarterback camera and another for the receiver camera.

At step 860, the resource manager of the present invention performs the process for providing the requested service to the user. Thereafter, the process 800 ends.

A. Policy Checking

According to one embodiment, the resource manager of the present invention may refuse to provide requested services to a user even when the resources are available. Significantly, the resource manager can be pre-programmed with "policy statements" that dictate the conditions under which certain "services" will be provided to certain users. An example of a "policy statement" would be "user X is allowed to watch only Y hours of TV per day." In this example, after user X has identified himself to the home network and requested a "service" involving "watch TV", the resource manager would check whether the user has exceeded his daily limit of two hours of TV before performing the requested "service". If the limit has been exceeded, the resource manager will enforce the policy by refusing TV access to the user. Another example is that if content is broadcasted with difference presentations, some presentations may have different ratings (e.g., PG-13, R, etc.). The resource manager of the present invention may also allow or disallow different presentations of the same content.

In one embodiment, the home server of the present invention keeps track of the activities of the users via a logging manager. By keeping an accurate record of the activities of the users, more complicated policy statements can be applied by the resource manager. For instance, for the policy statement "user X can only watch TV programs for Y hours per day" to be enforceable, the daily activities of user X must be monitored. In the present embodiment, a logging manager maintains a record of user activities. The resource manager, in order to enforce the policy, accesses the record via the logging manager to determine whether the time limit has been reached. If the limit has been reached, the resource manager would enforce the policy by refusing to provide or halting the TV program services to user X.

As another example, another policy statement may be "user Z can only spend $500 on on-line shopping each month." In this example, whenever user Z spends money purchasing items via an on-line shopping network, the money spent will be recorded by the logging manager. Further, whenever user Z requests to access an on-line shopping network, the resource manager will determine whether the pre-defined limit has been spent. If not, the resource manager provides the requested services by allowing user Z to access the on-line shopping network via the home network. However, if the limit has been reached, the resource manager will enforce the policy statement by refusing user Z access to the on-line shopping network.

B. Resource Checking

According to one embodiment, the resource manager of the present invention manages "soft" resources in addition to "hard" resources. For simplicity, in the following discussion, "hard" resources refer to the electronic devices, or hardware, of a home network. "Soft" resources, on the other hand, refer to resources that are not "hard" resources. Examples of "soft" resources include a particular broadcast program, a TV channel, memory address space, a segment of an VCR tape that contains a movie or TV program, a home-shopping web-page, credits that can be used towards purchasing items on a home-shopping web-page, interactive games, etc. Another example of a "soft" resource is different camera shots for broadcast content. This can include different audio channels or meta-data. The definition of "soft" resources herein is broad. The resource manager is capable of managing hard and soft resources.

According to one embodiment, the resource manager of the present invention treats network bandwidth to be a "soft" resource. A specific process of the resource manager, called the path manager, routes A/V streams from source devices to display devices via the home network. Network bandwidth is treated as a soft resource by the resource manager because network bandwidth is limited. Thus, the resource manager may refuse to provide a service if the requisite network bandwidth is unavailable.

In accordance with one embodiment, once the resource manager of the present invention has determined that a request for service does not violate any policy statements, the resource manager must determine whether the hard resources or soft resources necessary for providing such services are available. This is accomplished with the use of a resource pool. In the present embodiment, once a resource is used, it is removed from the resource pool. And, when a service is completed (or aborted by the user), the freed-up resources are returned to the resource pool. If resources become unavailable, they will be removed from resource pool. For instance, if a TV is unplugged, the TV resource will be removed from the resource pool.

An example illustrating the function of the resource pool follows. Suppose user Z requests a service for watching a movie at the family room and suppose the movie is stored as a DVD within a DVD-juke box. The resource manager upon determining that such a request does not violate any policy statements, will cause the DVD-juke box device (a hard resource) to be removed from the resource pool. The DVD containing the movie will also be removed from the resource pool. A certain amount of network bandwidth will also be removed from the resource pool because network bandwidth is required for delivering the movie service from the DVD-juke box to the TV in the family room. Thus, while the movie is being played, another user will not be able to obtain services that require some or all of the resources that are currently in use. For example, user X may request to watch a cartoon that is stored in the same DVD-juke box containing the DVD for the movie. Since the DVD-juke box is no longer in the resource pool, the resource manager will inform user X that the cartoon service is not available. An exception, however, is that if user X has a higher access privilege than user Z, then services will be provided to user X, and any services currently provided to user Z will be terminated.

IV. Exemplary Implementation of the Resource Manager

Figure 3:
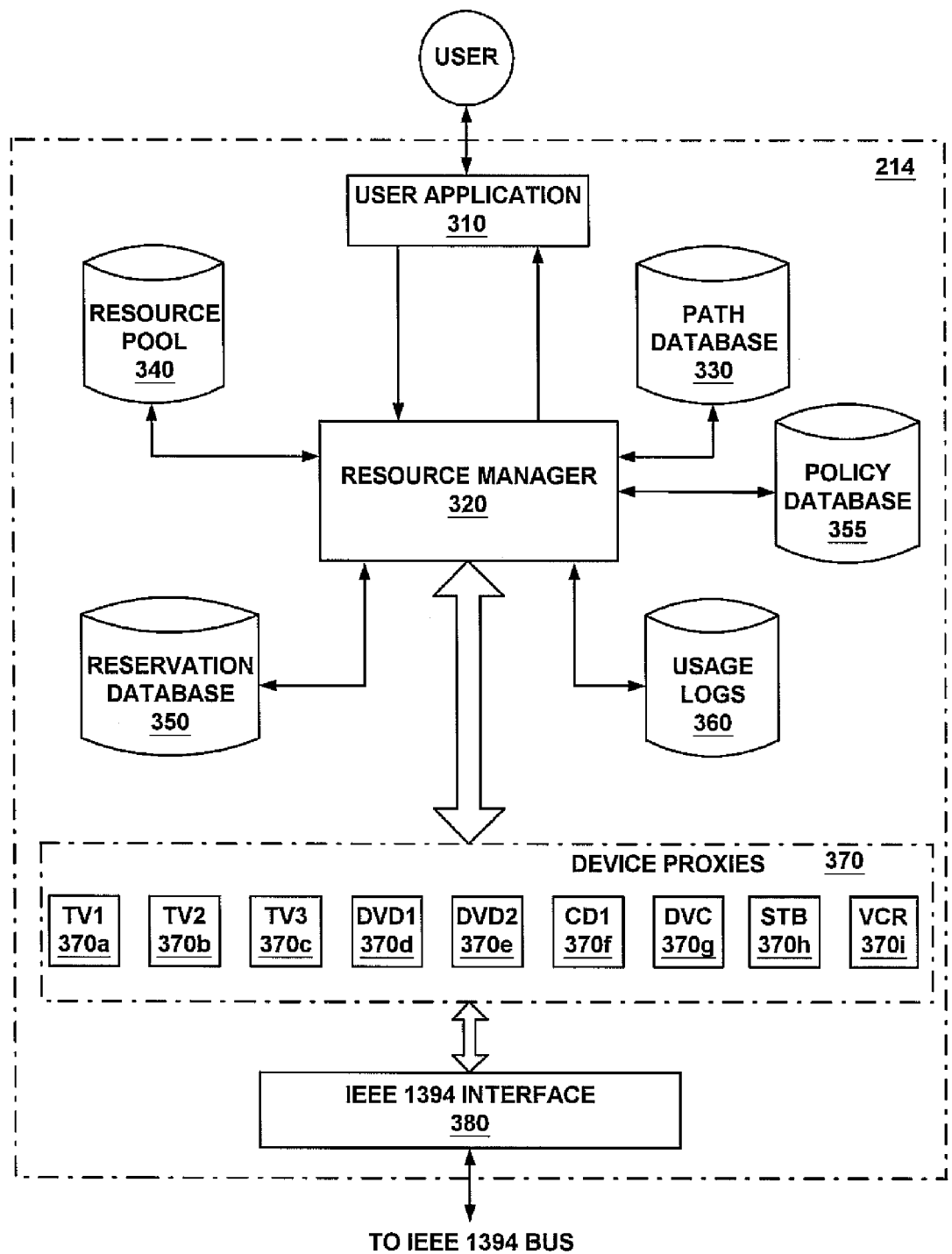
FIG. 3 is a logical block diagram of the software processes of a home server illustrated in FIG. 2 in accordance with the present invention.

FIG. 3 is a logical block diagram of the software processes of a home server 214 in accordance with the present invention. As illustrated, software processes of home server 214 include a user application 310, a resource manager 320, a path database 330 and a resource pool 340. Software processes of the home server 214 further include a reservation database 350 and a usage log 360. Importantly, home server 214 includes a database 355 for storing policy statements. Home server 214 further includes a plurality of software device proxies 370a-370i each for controlling one of the devices of home entertainment network 200. For example, software device proxy 370c is for controlling TV 211c, and device proxy 370l is for controlling VCR 212, etc., that are coupled to the IEEE 1394 bus interface 380. In one embodiment of the present invention, the software device proxies 370 may include HAVI Device Control Modules (DCMs) and Functional Control Modules (FCMs).

Significantly, according to the present invention, user interface or user application 310 is not allowed to communicate directly with software device proxies 370. Rather, user application 310 communicates to the resource manager 320 the services that the user desires to be performed. Particularly, user application 310 receives a service-based request from a user or other entities, and transmits the request to the resource manager 320.

In the present embodiment, the resource manager 320 of FIG. 3 determines whether the service-based request violates any policy statements stored within policy database 355. Thereafter, the resource manager 320 determines the availability of the source and destination devices, and checks whether sufficient bandwidth is available for carrying out the requested action. If policy statements are not violated and the devices and the bandwidth are available, the resource manager 320 will return a "granted" signal to user application 310 and transmits the necessary control commands to the software device proxies 370a-370i. The software device proxies 370a-370i then control the devices via IEEE 1394 bus interface 380. If the devices or the requisite bandwidth are not available, or if one or more policy statements are violated, the resource manager 320 will return a "denied" signal to the user application 310.

According to the present invention, resource manager 320 allows the resources of home network 200 to be checked-in or checked-out independent of application requests. At any time, the resource manager 320 can reclaim checked-out resources and reallocate them to other users. Likewise, a reserved resource can be reclaimed and reallocated to other users or reallocate them back into the resource pool 340.

According to the present invention, the resource manager 320 of FIG. 3, upon initialization of the home server 214, scans the home network 200 and determines all the available resources. Data representative of the routing paths and their bandwidths are then stored within path database 330. Data representative of the available devices are stored within resource pool 340. As the resources of the home network 200 changes, the resource manager 320 modifies the path database 330 and the resource pool accordingly.

User application 310 may also send a request for media services to be delivered at a future time. In the present embodiment, the request is in the form of a scheduled-event list. Particularly, the scheduled-event list may indicate the time the scheduled-event is to be performed, and the necessary routing paths and device information. The resource manager 320, upon receiving the scheduled-event list, then checks the reservation database 350 to determine whether the devices and the routing paths have already been reserved by other processes. If not, the resource manager 320 then enters the devices and routing paths within the reservation database 350. The resource manager 320 also accesses a scheduler (not shown) to schedule the future execution of the scheduled-event list.

Usage information of the network is stored within usage log 360 of FIG. 3. According to the present invention, every time a request for media service is granted, the event list is stored within the usage log 360. The usage information can be used to track warranty information of the devices. In addition, the usage information can be used to track the network usage of each user. The usage information may also be used by the resource manager 320 for restricting access to certain users who have exceeded their usage limitation.

It should be noted that, in one embodiment, the resource manager 320 is initialized before the home server 214 is booted up. During the initialization phase, the resource manager 320 queries the home network for available resources and their respective "usage rights" and associated policies. As new resources are added or removed from the home network, the resource database (or resource pool) 340 will be updated. The way the resource manager 320 discovers the new resource is through a system registry or system event process. The registry ro system event process is allowed to convey resource information and other information to the resource manager.

Figure 4:
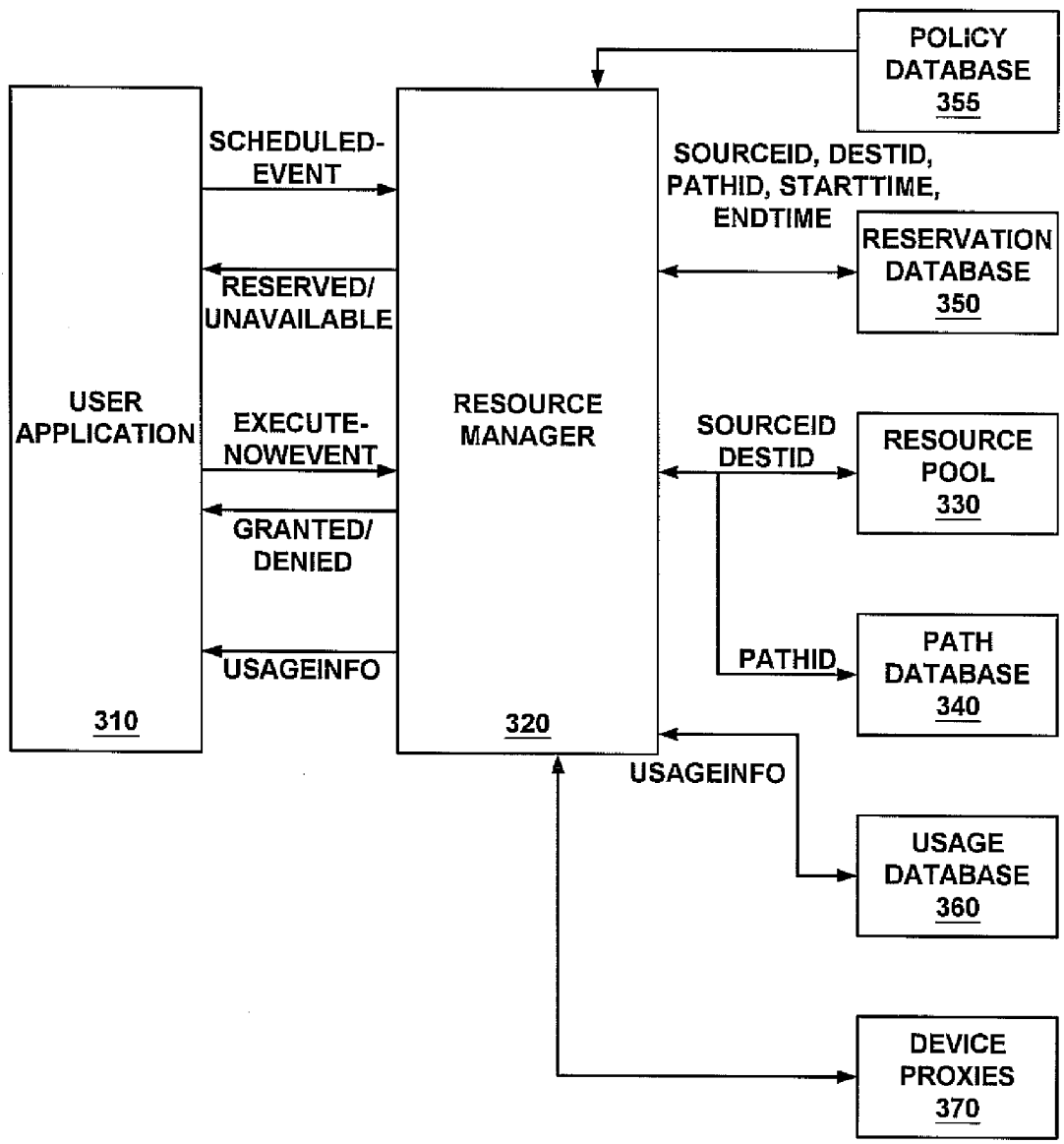
FIG. 4 is a data flow diagram illustrating the communication protocol between user application and software resource manager illustrated in FIG. 3 in furtherance of the present invention.

FIG. 4 is a logical block diagram 400 illustrating the data flow between user application 310 and resource manager 320 in accordance with an embodiment of the present invention. Data paths between resource manager 320 and reservation database 350, resource pool 330, path database 340, policy database 355, usage log 360 and device proxies 370 are also illustrated. Resource manager 320 stores device usage information within the usage log 360. In addition, the resource manager 320 may send a UsageInfo to the user application 310 when prompted.

Figure 5:
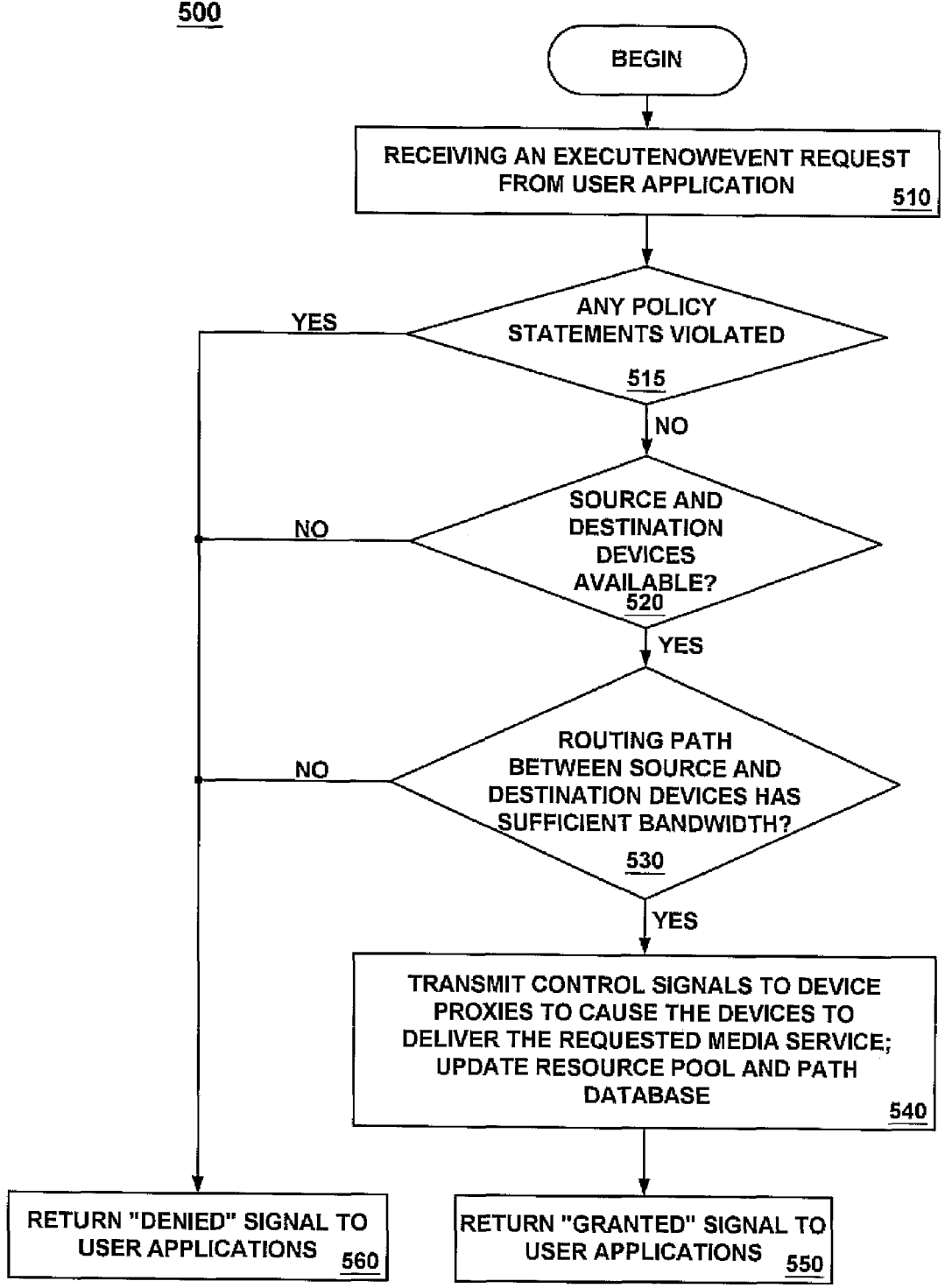
FIG. 5 is a flow diagram illustrating steps of the process of managing network resources according to an embodiment of the present invention.

FIG. 5 is a flow diagram illustrating the steps of a process 500 for managing network resources according an embodiment of the present invention. The process 500 is described in conjunction with FIG. 4. As illustrated, at step 510, resource manager 320 receives an ExecuteNowEvent request from the user application 310. According to the present embodiment, the ExecuteNowEvent request consists of information regarding identity of the user making the service-based request and the requested action. The ExecuteNowEvent request further includes information such as the source device (SourceID), the destination device (DestID) and the routing path between the source device and the destination device (PathID).

At step 515 of FIG. 5, the resource manager 320, upon receiving the ExecuteNowEvent request, looks up the policy database 355 and determines whether any policy statements are violated by the service-based request.

If it is determined that policy statements are violated, the process enters step 560, where the resource manager 320 of the present invention denies the service-based request.

However, at step 520, if it is determined that no policy statements are violated, the resource manager looks up the resource pool 330 and determines if the requested source and destination devices are available. According to the present invention, the resource pool 330 is a list of all devices connected to the network and is constructed upon initialization of the home server 210. The resource pool 330 is also continuously updated to keep track of devices that are added to and removed from the home entertainment network 200. If the source and destination devices are already in-use by other users or user-applications, a "Denied" signal is returned to the user application 310 at step 560.

At step 530, the resource manager 320 looks up the path database 340 to determine if there is sufficient bandwidth between the source device and the destination device. In the present embodiment, the path database 340 is a table for identifying the bandwidth requirements for all possible routing paths between the devices. Methods of calculating and determining the bandwidth requirements for all possible routing paths between the devices are well known in the art, and are therefore, not described herein to avoid obscuring aspects of the present invention. If the resource manager 320 determines that insufficient bandwidth is available, the resource manager 320 returns a "Denied" signal to the user application 310 at step 560. If the requested resources are available, sends control signals to the device proxies 370 and causes the devices to carry out the media service-based request immediately at step 540, and returns a "Granted" signal to the user application 310 at step 550. In addition, the source devices and destination devices are removed from the resource pool 330, and the path database is updated to reflect the bandwidth usage at step 540.

Figure 6:
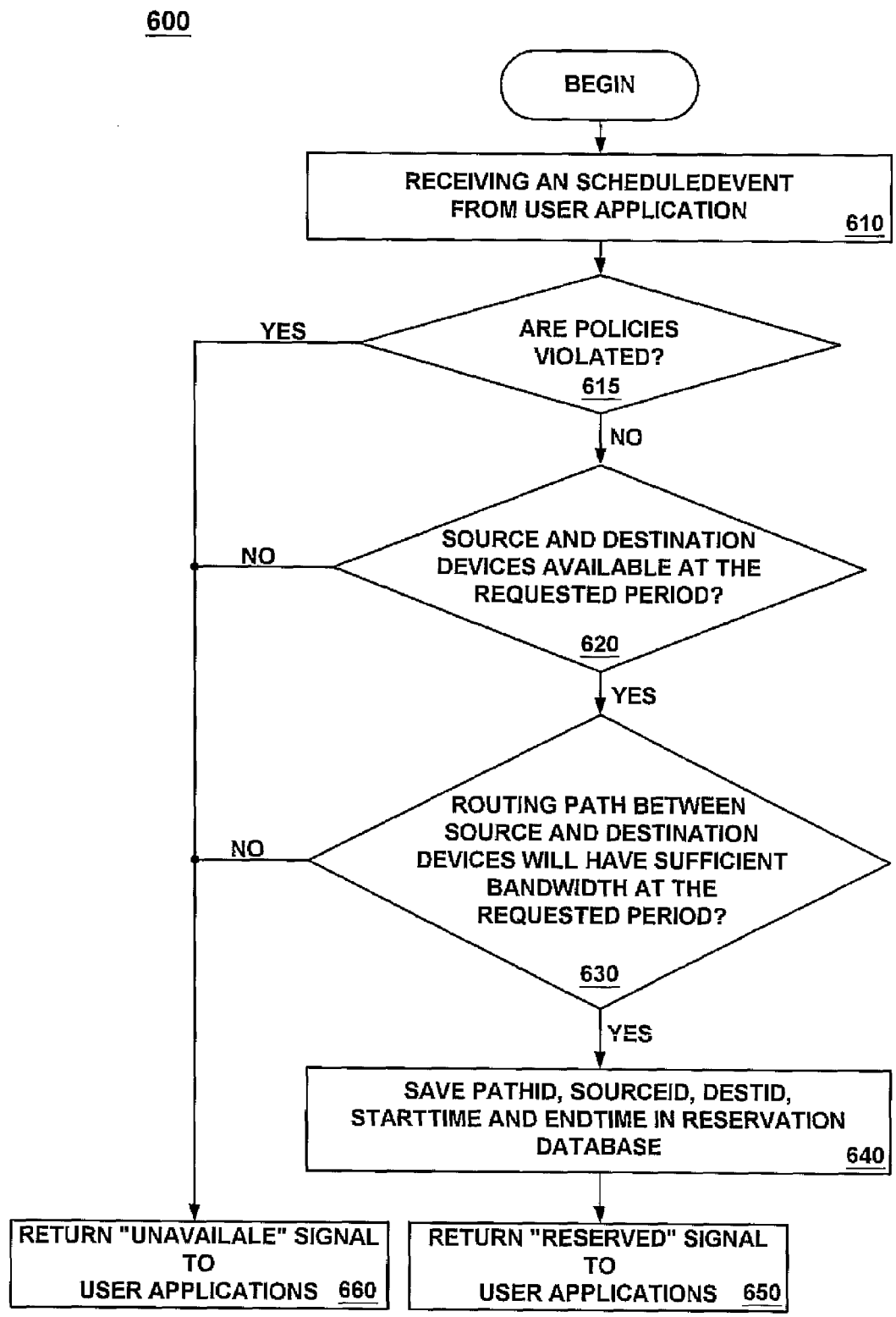
FIG. 6 is a flow diagram illustrating steps of the process of reserving network resources according to an embodiment of the present invention.

FIG. 6 is a flow diagram illustrating the steps of a process 600 for reserving network resources according to an embodiment of the present invention. The process 600 is described also in conjunction with FIG. 4. As illustrated, at step 610, resource manager 320 receives an ScheduledEvent request from the user application 310. According to the present invention, the ScheduledEvent request consists of information regarding identity of the user making the media service-based request, the start time (StartTime) and end time (EndTime) of the scheduled event and the requested action. The ScheduledEvent request may further include information such as the source device (SourceID), the destination device (DestID), the routing path between the source device and the destination device (PathID).

In another embodiment of the present invention, Scheduled Event request may include two types of requests: ExecuteWallClockEvent and ExecuteCalendarEvent. The ExecuteWallClockEvent request is for scheduling future execution of requests based on a 24-hr clock. The ExecuteCalendarEvent is for scheduling future execution of requests based on the calendar. For example, the ExecuteWallClockEvent request is used for scheduling the recording of the "Evening News" at 6:00 pm in the evening everyday. As another example, the ExecuteCalendarEvent request is used for scheduling the backing-up of the home computer system every Sunday.

At step 615 of FIG. 6, the resource manager 320, upon receiving the ScheduledEvent request, looks up the policy database 355 and determines whether any policy statements are violated by the service-based request.

If it is determined that policy statements are violated, the process enters step 660, where the resource manager 320 of the present invention denies the service-based request.

At step 620, the resource manager 320 looks up the reservation database 350 and determines if the requested source and destination devices are available. If the source and destination devices are already reserved by other users or other user applications, an "Unavailable" signal is returned to the user application 310 at step 660.

At step 630, the resource manager 320 looks up the path database 340 to determine if other reservations would affect the bandwidth of the routing path between the source device and the destination device at the request period. If the resource manager 320 determines that the routing path will be affected, the resource manager 320 returns a Failure signal to the user application 310 at step 660. If it is determined that the routing path will not be affected, the resource manager 320 then stores the SourceID, DestID, PathID, StartTime and EndTime within the reservation database 350 at step 640, and returns a "Reserved" signal to the user application 310 at step 650.

VI. Request Event Manager (REM) and Service Request Lists (SRLs)

The preceding discussion has focused on a resource manager adapted for managing resources within a network of consumer electronic devices and for presenting a content-centric view of the network to the users. This section describes a request event manager (REM) that translates service-based content-centric requests into device-specific events, and executes the service-based requests by scheduling, co-ordinating, controlling and executing the device-specific events by means of service request lists (SRLs).

Today there are many different home-network solutions that focus on middleware infrastructures (i.e., HAVI, Jini, UP&P, VHN, etc.). However, none of the middleware solutions offer home-network applications support when it comes to synchronizing different network activity over time and across interconnected heterogeneous consumer electronic devices. For example, if an application wants to tune the cable set top box (STB) to channel 12 at 4:59 pm everyday, record a TV show at 5:00 pm everyday, rewind the VCR tape at 6:05 pm everyday, eject the tape from the VCR at 6:10 pm, then power off the VCR unit at 6:15 pm everyday, and forward all telephone calls between 9:00 am-4:00 pm everyday, the application would have to develop complicated logic to perform these tasks. If a user varied his schedule the application logic would have to be modified to reflect the needs of the user. This would complicate the application and limit the flexibility of home networking applications. Moreover, before the home-network applications schedule and execute any service, they have to know all the specific APIs (Application Programming Interfaces) and dependencies for each consumer electronic device on the home network. If a new consumer electronic device with different methods is installed on the network and the consumer electronic device offers similar or identical features to existing devices on the network, the application would have to be re-architectured. Therefore, a database of services is necessary to abstract methods and idiosynchrocies from interconnected consumer electronic devices, to logically group network services, and to schedule their execution over time. Accordingly, the present invention provides a request event manager that receives service-based requests from a user or a user application, and then converts the service-based requests into device-specific events that are executable by individual device of the network.

Figure 11:
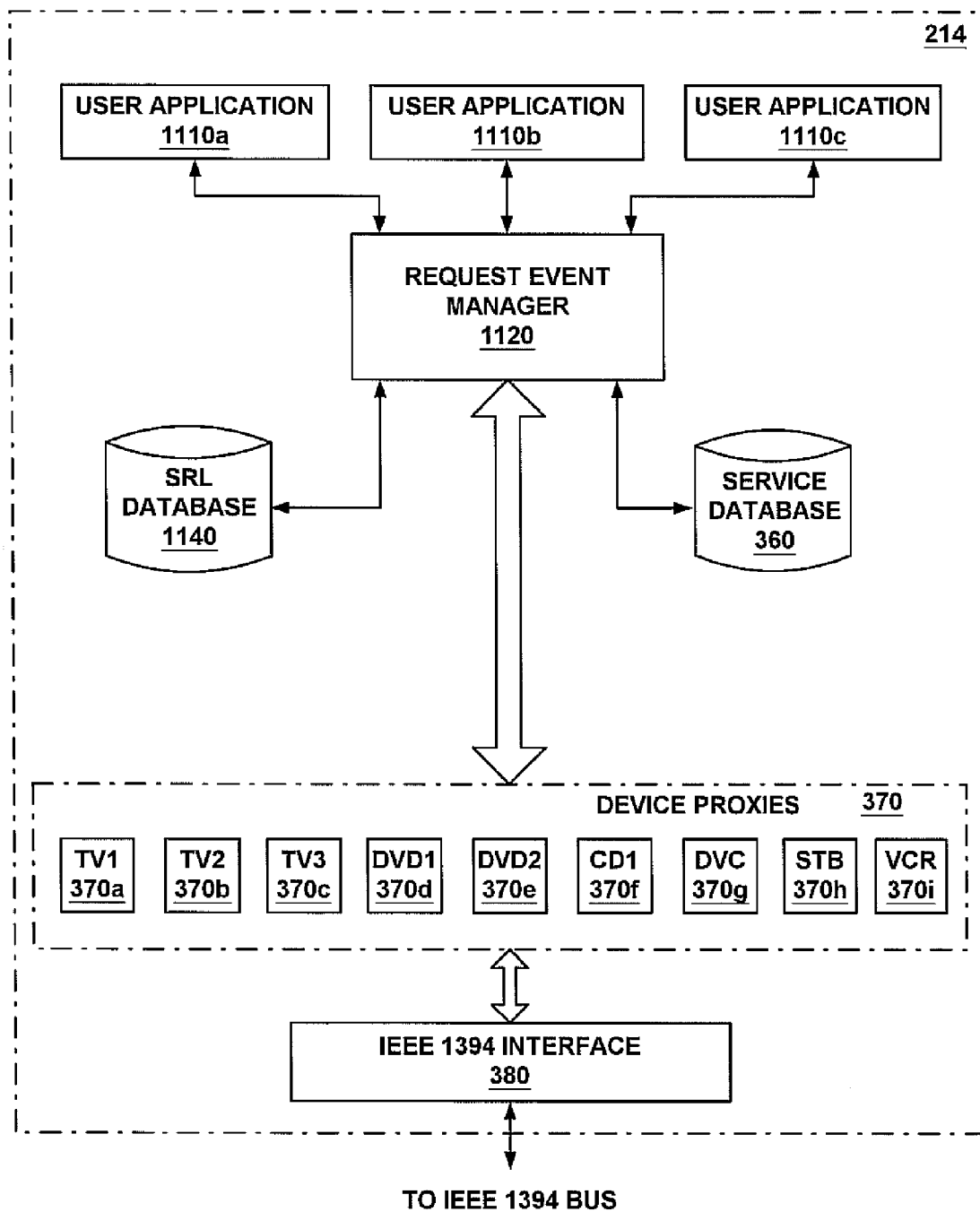
FIG. 11 is a block diagram illustrating the software processes including a request event manager process of a home server in accordance with one embodiment of the present invention.

FIG. 11 is a logical block diagram of the software processes of a home server 214 in accordance with the present invention. As illustrated, software processes of home server 214 include user applications 1110a-1110c, a request event manager 1120, a service database 1130 and a service request list (SRL) database 1140. Software processes of the home server 214 further include a plurality of software device proxies 370a-370i each for controlling one of the devices of home entertainment network 200. For example, software device proxy 370c is for controlling TV 211c, and device proxy 370i is for controlling VCR 212, etc., that are coupled to the IEEE 1394 bus interface 380. In one embodiment of the present invention, the software device proxies 370 may include HAVI Device Control Modules (DCMs) and Functional Control Modules (FCMs).

According to the present invention, service database 1130 is a database of home-network services encompassing interconnected consumer electronic device's methods, functionality and content. The request event manager 1120 of FIG. 11, upon initialization of the home server 214, scans the home network 200 and identifies all the devices that are connected thereto. The request event manager 1120 also identifies the content that are stored within the devices. Data representative of the functionality of the devices and their content are then stored within service database 1130. As devices and/or content are added and/or removed from the home network 200, the service database 1130 is also updated accordingly.

Significantly, according to the present invention, user interface or user applications 1110a-1110c do not communicate directly with software device proxies 370. Rather, user application 1110a-1110c communicate service-based requests to the request event manager 1120. "Services" herein refer to systems for and methods of providing the users of the home network with the content accessible by the network and use of the devices of the network. For example, a service provided by the home server may be the delivery of a movie to a particular room in the house. A service-based request herein refers to a request for "services" as defined above. The request event manager of the present invention converts service-based requests into device-specific events, and schedules, controls and executes these device-specific events such that services can be performed with minimal user control.

According to the present invention, the request event manager 1120 logically associates the service-based requests to the information that is stored within service database 1130. That is, the request event manager 1120 converts the service-based request into device-specific events that are necessary for carrying out the service-based request. The device-specific events are then stored within the SRL database 1140 in the form of service request lists. SRLs are then executed by the request event manager 1120 at their scheduled execution time. Request event manager executes device-specific events by transmitting the necessary control commands to the software device proxies 370a-370i. The software device proxies 370a-370i then control the devices via IEEE 1394 bus interface 380.

One advantage of the present invention is that complicated services that involve multiple devices of the home network over time can be easily managed. For example, for a service-based request that entails "Play Movie S at 9:00 pm", the request event manager 1120 determines whether the content Movie S is available by checking the service database 1130. If the service database indicates that the Movie S is a 2-hour long movie and is going to be broadcast at 7:00 pm, the request event manager 1120 then checks a recording device (e.g., a A/V HDD, digital VCR, a DVD-RAM device, etc.) to determine whether sufficient recording medium is available. The request event manager 1120 also checks whether the devices are available at those time slots, for example, by checking the SRL database 1140. The request event manager 1120 may return a "denied" signal to the user application if the requested service is not available. If the devices are available, the request event manager 1120 may return a "granted" signal to the user application, and may construct an SRL for the service-based request. The SRL is then stored within database 1140, and is executed according to the scheduled execution time. In this way, all the home-network application needs to do is query the REM database and/or submit a service request to be executed at a desired time. A more detailed description of an SRL will be presented below.

The service offerings listed in the REM database are relative to the aggregate consumer electronic device's capabilities across the home network and not necessarily from any single device or source. For example, if some audio and video content is being played to the TV, the video may be originating from one or more devices (i.e., a hard disk drive, DVD, etc.) while the audio signal may be originating from a completely different source device. From the user's perspective the audio/video (A/V) signal appears to be originating from the same source. Therefore, the application may not even know the home-network has multiple video sources that contain audio and video content. All the application sees is that content offerings originates from the REM service database. This feature is achieved by constructing a service request list (SRL) that details the source(s) and destination device(s) along with control and timing information. The SRL may also information describing how the content is played back and possible special play features (i.e., video fade, scroll, overlay, etc.). For example, if a two hour video clip is designated as the source material, a SRL can be constructed that play only twenty minutes of video that has been designated significant. The SRL would be constructed in such a way that only the significant segments are viewed and the rest of the video segments are skipped.

Figure 9:
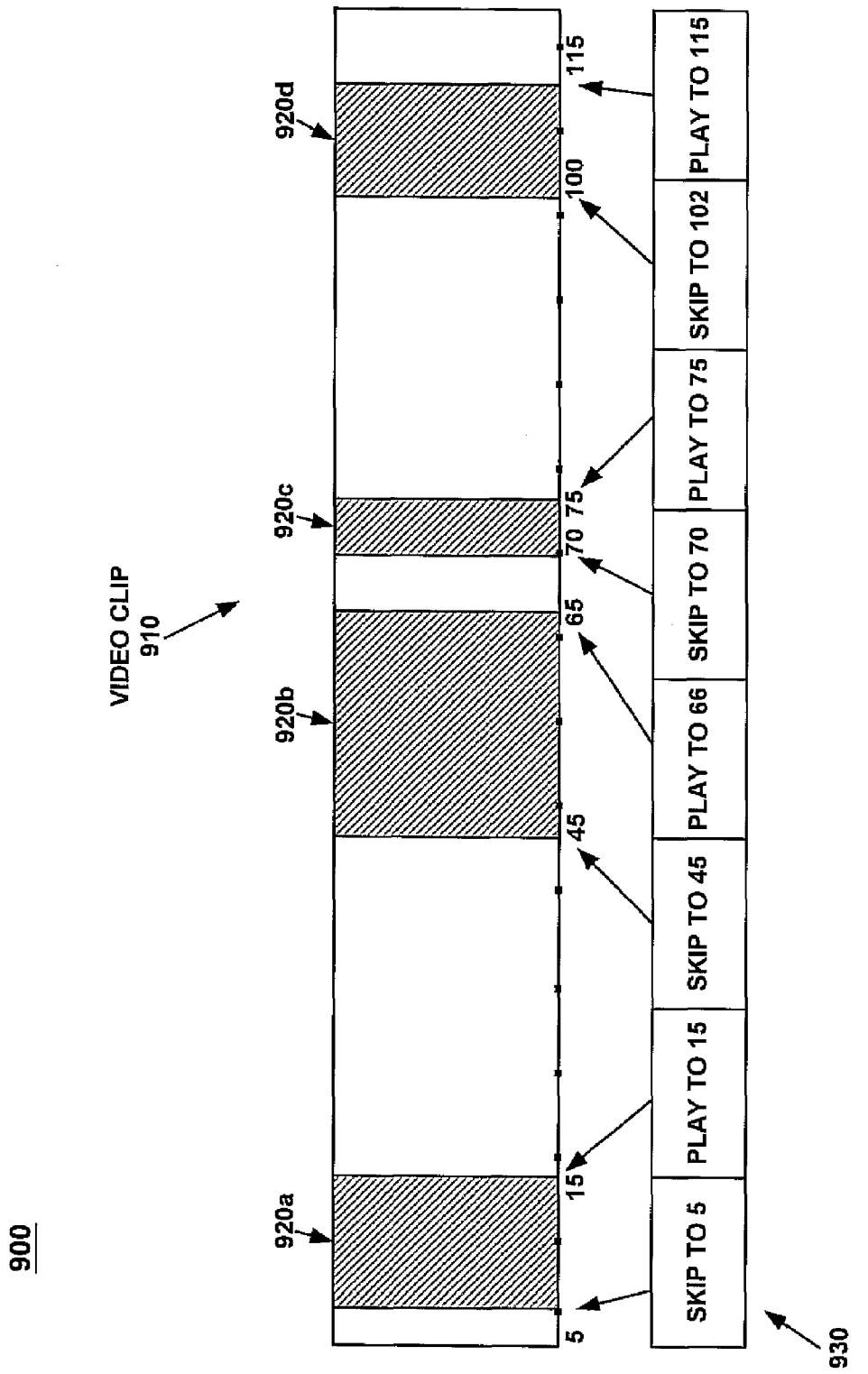
FIG. 9 illustrates a logical diagram of an exemplary 2-hour video clip a service request list that describes how the video clip should be played according to an embodiment of the present invention.

FIG. 9 illustrates a logical diagram 900 of an exemplary 2-hour video clip 910. As illustrated, video clip 910 includes four segments 920a-920d each corresponding to segments of the video clip 910 that are designated significant. Also illustrated is an SRL 930 that describes how the video clip 910 should be played such that only the appropriate segments are played.

In one embodiment of the present invention, the SRL may contain detailed information about the source and destination devices. Also contained in the SRL may be information about how and when the video is played back. The SRL may also contain routing information that allows the source to be routed to the destination device. If a HAVI network is used, this task could be performed by the Stream Manager. Once the SRL has all the information it needs, it will essentially skip to the start of the significant video segments and will start playing only the significant segments until the all of them are played.

In other cases, the application may want to know the available program selections (i.e., movies, EPG, etc.) that can be recorded and viewed at a time to be determined in the future. In this case, the application queries the REM database for A/V content offerings and determines what it wants to view, and then schedules a time for viewing the A/V content. In the present embodiment, timing information may be specified by a calendar date, a sequence of times/dates, a relative time/date (e.g., 2 hours from now), or an absolute time/date.

According to one embodiment of the present invention, once the application determines what services it needs, it can create a SRL using the REM's API calls. The REM will provide methods that allow the application to construct, delete, and modify service request lists. Also, if the application chooses it can archive the SRL and call upon it in the future. The SRL can even be logically linked together allowing the ability to create more complex lists. To allow for greater flexibility individual SRL events can be modified throughout the life span of the SRL.

A discussion of a simple scenario follows. An exemplary service-based request may be "Record 'Sesame Street' from 9:00 am to 10:00 am and playback the recorded program at 3:00 pm." The request event manager of the present invention, upon receiving this service-based request from a user or a user application, determines the necessary devices of the network for carrying out this service-based request. In this example, the necessary device would be a tuner, a recording device (e.g., a DVD RAM, digital VCR, A/V HDD, etc.) and a video display device (e.g., a digital TV). The request event manager then assembles a SRL to be executed according to the timing information contained therein. The SRL contains all the specific details for controlling the tuner device, the recording device, display device, routing information, and timing sequence. For instance, the SRL may contain an event "set-up STB at 8:59 am" and another event "set-up A/V HDD at 8:59 am". The request event manager of the present invention is also configured for executing these events at the appropriate times.

Controlling and managing all these devices, routing data, and scheduling each device to perform a task at specific times can become overwhelming. Nonetheless, the REM of the present invention is designed to handle these kinds of operations with a minimal set of commands. The REM hides the device interface from applications and presents high level methods for controlling content and not devices. The SRL will be given an "event name" which the REM will maintain within the SRL database. The SRL is also made available to user applications. User applications reference SRLs by the event name and can alter its characteristics at any time. All the application has to do is query the REM service database and construct an SRL.

SRLs are hierarchical data structures with the top level containing the "event name" and the lowest level containing all the device's specific commands necessary to carry out the desired service. In the case of the HAVI network the lower levels of the SRL (i.e., unit level or sub-unit level if the list expands past the unit level) would be the interface to the HAVI DCM/FCMs. Each level in the SRL contains timing information and attribute information. For example, if a set top box (STB) is to be setup for an operation, the REM of the present invention may assign a setup execution time. At the unit level, individual times will be assigned by the REM for each operation in the setup sequence. The event list is logically layered depending on the complexity of the service and the number of resources required for carrying out the service.

The top level of the SRL (event list) structure is referenced as the Service Level. This level contains a handle for accessing the request list and descriptive information as well as timing information. The next level down in the SRL is referenced as the Component Level. At this level, high level commands can be issued for individual components. Also at this level heterogeneous components can be linked to perform specific operations. At the Unit Level the individual component commands (i.e., Power-On, Fast Forward, Seek, etc.) are issued. At the Sub-unit level, commands are issued for each individual sub-unit of the unit. Sub-units of a HAVI compliant device, such as the clock sub-unit, motor subunit, tuner sub-units, etc., of a VCR, are defined by the HAVI architecture and can be controlled by individual FCM ("Functional Control Module"). For example, before a consumer electronic device can be powered onto a channel, the device has to be allocated. The device has to be polled to make sure it is on-line. This may be done at the Sub-Unit level. In some cases these low-level commands may be AV/C command that are sent to the device. For example, an AV/C command may be set to a device issuing the specific power-on command. Once this is done the REM would wait for the device to respond with a status message (e.g., successful or unsuccessful). In some cases the SRL data structure may be even more complex and may expand into more layers. The complexity of the data structure is variable and may depend on the level of complexity of the individual devices and the operations being requested.

Figure 10:
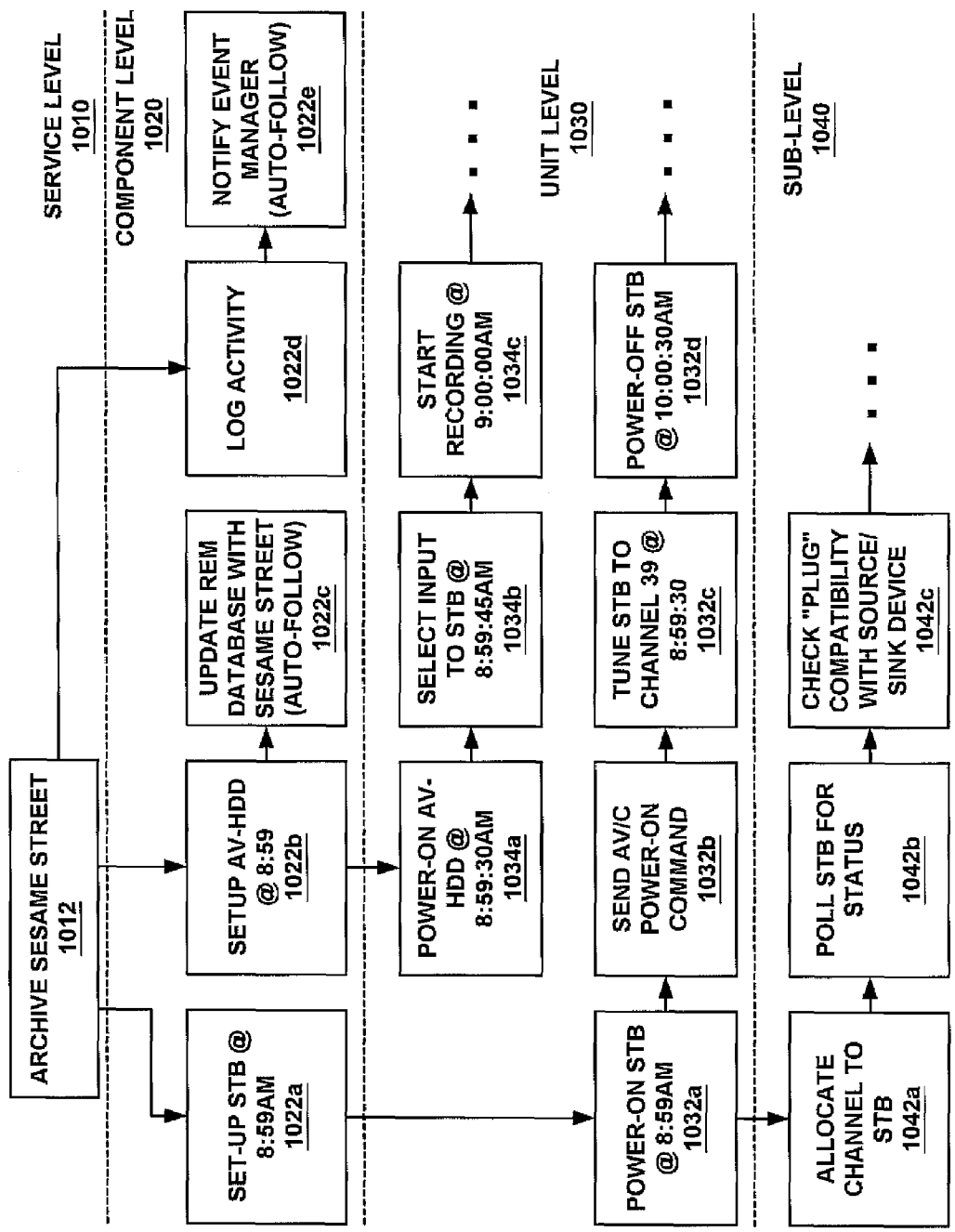
FIG. 10 illustrates a portion of the hierarchical structure of an exemplary service request list in accordance with an embodiment of the present invention.

In accordance with an embodiment of the present invention, FIG. 10 illustrates a portion of the hierarchical structure of an SRL 1000 that groups an STB, an AV-HDD and a logging database to perform a service. As illustrated, SRL 1000 has four different levels: Service Level 1010, Component Level 1020, Unit Level 1030 and Sub-unit Level 1040. In the exemplary embodiment as illustrated, at the service level 1010, SRL 1000 includes a service level command "Archive Sesame Street" 1012. At the Component Level 1020, the service level command 1012 is associated with five component level commands 1022*a*-1022*e*. It should be noted that component level commands are directed to components of the home network that are required for carrying out the service. For example, command 1022*a* is directed to an STB, command 1022*b* is directed to an AV-HDD and command 1022*d* is directed to a logging database, etc. Each of the component level commands 1022*a*-1022*e* are associated with unit level commands. For example, in the illustrated embodiment, component level command 1022*a* is associated with unit level commands 1032*a*-1032*d* that are specific to a STB. Component level command 1022*b* is associated with unit level commands 1034*a*-1034*c*. Each of the unit level commands 1032*a*-1032*c* may be associated with sub-unit level commands (e.g., commands 1042*a*-1042*c*). In the illustrated embodiment, sub-unit level commands 1042*a*-1042*c* controls the sub-units of an STB.

At each level of the SRL, timing information must be specified. This information is maintained by the REM and can be altered to reflect specific occurrences defined by the application, REM, or another system component (i.e., an HAVI Device Control Module). Time can be measured in terms of a calendar date or 24 hour wall clock time. For example, the REM can be scheduled to perform a certain operation on every January 1. As another example, the REM may be scheduled to perform certain events every Monday through Friday at 5:00 pm. The REM defines events as occurring only once, repeatedly, or in given intervals as defined by the application. Also, time can be relative to another event start time or end time. This is referred to an auto-follow event. For example, after a Power-On Event occurs a Rewind Event can be issued thirty seconds after the Power-On Event. After a Power-Off Event is issued, a Message Event can be sent to an application. Therefore, the Rewind Event is dependent on the occurrence of the Power-On Event, and the Message Event is dependent on the occurrence of the Power-Off Event.

In summary, the REM is part of the middleware framework in a home/office system or network for delivery of audio/video presentations and other content. It concatenates or hierarchically aggregates smaller and simpler events into larger and more complex events. It also executes events. It manages the event list data structure/database. It also provides read and write access to the event list to the applications level and to other components within the framework level.

Some significant features of the REM and the advantages of these features are further summarized as follows:

1. Device Independence

The REM treats events the same regardless of what device or devices they relate to. Devices include but are not limited to heating, ventilation and air conditioning (HVAC) systems, audio/video appliances, Internet or cable service interfaces, etc. This allows complex events to be built up that neatly package or encapsulate smaller events on disparate sets and types of devices.

2. Scheduling Flexibility

Events can be scheduled at absolute times or at times relative to the time at which they are scheduled. The schedule can be based on a time of day clock, a time and day of week, a time and specific date, etc. The schedule can be an auto-follow time, i.e. one that automatically follows the completion of another event. The schedule can be based on an asynchronous and even unpredictable event; for example, if the phone rings, up the room lights, mute the movie and answer the phone.

3. Hierarchy

Event lists represent a set of sub-events. The sub-events may be events defined as an event list, or they may be a "primitive" operation that is performed by a device in the system or network. There is no limit to the depth of nesting of events and sub-events and any event may contain any other event as one of its sub-events.

The advantage of this is that as system becomes more complex, the event structures automatically become more flexible and thus more able to handle the complexity. This applies both to an increase in complexity of individual devices and to an increase in complexity of the system or network, which can including a potentially unlimited set of devices.

Another advantage of this is that events may represent an aggregation of sub-events on disparate device types. For example, home control functions can be linked in with audio/video appliance functions—when the door bell rings, have the security camera output presented on the active television set.

Another advantage of this is that the user can schedule events that are meaningful to him. For example, what the user would like to think of as a "record" event can hide or encapsulate the complexity of a lower-level series of sub-events: power on the recording device; check that it has tape/disk loaded, rewind the tape or position the disk, set recording parameters (e.g. SP mode on a video tape), and record.

Another advantage of this is that events are centrally controlled. Users, applications programs and other middleware functions can access the current set of active and scheduled events in a consistent manner regardless of the device or devices supported.

4. Concurrency and Sequentially within Events

Event lists can represent both a sequence of events that fire (i.e. are initiated) in the order given in the list, or a multi-threaded set of events that occur concurrently. Also, via hierarchy, an event can be any combination of these two types of sets.

When an event that represents a series of sequential events fires, then the first of its sub-events fires, when that completes the second of its sub-events fires, and so on. When an event that represents a set of concurrent sub-events fires, then each of its sub-events are scheduled to fire in an indeterminate, concurrent or parallel manner.

One advantage of this feature is that, again, as the devices supported become more complex, the event structures automatically become more flexible and more able to handle the device complexity. Another is that, again, the user can work with higher-level events that are meaningful to him.

5. Concurrency Among Events

In a typical system or network, multiple events will be active at the same time. The advantage of this is that, as the system grows in complexity, the same event handling, scheduling and control mechanisms apply.

6. Support and Synergy with Other Functions

The REM also provides support for and synergy with other middle-ware/framework functions. Additionally, the REM also provides support for and synergy with applications functions.

The present invention, a computer implemented process for scheduling and executing service-based requests, has thus been described. The computer implemented process may include a computer readable medium containing therein computer readable codes for causing a computer system to perform a method of synchronizing different network activity over time as described above with reference to various embodiments. While the present invention has been described in particular embodiments, it should also be appreciated that the present invention should not be construed as limited by such embodiments, but should be construed according to the below claims.

What is claimed is:

1. A method comprising:

accessing a network service database containing a plurality of service offerings that aggregate capabilities of a plurality of devices coupled as a network;

receiving a service-centric based request from a user, based on one or more of said service offerings;

determining one or more resources of said network for carrying out said service-centric based request from said network service database, wherein said resources include one or more source devices, one or more destination devices and one or more communication links;

translating said service-centric based request into one or more device-specific events for carrying out said service-centric based request based on said network service database;

constructing a service request list based on said device-specific events, wherein said service request list is arranged as a hierarchical data structure that includes a top level and one or more lower levels, wherein said top level includes a handle logically associated with said service-centric based request, and descriptive information and timing information for carrying out said service-centric based request, and wherein a lower level includes one or more logical links between said resources, and one or more device-specific commands for carrying out the service-centric based request by said resources;

determining whether said service request list conflicts with another service request list; and provided that said service request list does not conflict with said another service request list, storing said service request list and scheduling said service request list for executing said plurality of device-specific events chronologically and sequentially according to said service request list.

2. A method as recited in claim 1 wherein said service request list further comprises information that describes routing information that allows content from said source devices to be routed to said destination devices.

3. A method as recited in claim 2 wherein said content comprises a broadcast program.

4. A method as recited in claim 1 further comprising:
  determining availability of said source devices, said destination devices and said communication links at a time said service-centric based request is to be rendered.

5. A method as recited in claim 1 further comprising denying said service-centric based request provided said service-centric based request is in conflict with said another service-centric based request.

6. A method as recited in claim 1 further comprising:
  presenting said plurality of service offerings to a user application, wherein said service-centric based request is received in response to said presenting said plurality of service offerings.

7. A computer readable medium containing therein computer readable codes for causing a computer system to perform a method of synchronizing different network activity over time comprising:
  accessing a network service database containing a plurality of service offerings that aggregate capabilities of a plurality of devices;
  presenting the plurality of service offerings to a user;
  receiving a service-centric based request from said user based on one or more of said service offerings;
  determining one or more resources for carrying out said service-centric based request from said network service database;
  translating said service-centric based request into one or more device-specific events based request based on said network service database;
  constructing a service request list based on said device-specific events, wherein said service request list is arranged as a hierarchical data structure that includes a top level and one or more lower levels, wherein said top level includes a handle logically associated with said service-centric based request and timing information for carrying out said service-centric based request, and wherein a lower level includes one or more logical links between said resources, and one or more device-specific commands for carrying out said service-centric based request by said resources;
  determining whether said service request list conflicts with another service request list; and
  provided that said service request list does not conflict with said another service request list, storing said service request list.

8. A computer readable medium as recited in claim 7 wherein said service request list contains details of a source consumer electronic device and of a destination consumer electronic device, said details comprising control information and timing information of said source consumer electronic device and said destination consumer electronic device.

9. A computer readable medium as recited in claim 8 wherein said service request list further comprises information that describes routing information that allows content of said source consumer electronic device to be routed to said destination consumer electronic device.

10. A computer readable medium as recited in claim 9 further comprising:
  determining availability of said source consumer electronic device and said destination consumer electronic device at a time said service-centric based request is to be rendered.

11. A computer readable medium as recited in claim 7 further comprising denying said service-centric based request provided said service-centric based request is in conflict with said another service-centric based request.

12. A computer readable medium as recited in claim 7 wherein said service request list schedules said device specific-commands for executing chronologically and sequentially according to said service-centric based request.

13. A home server for coupling to a network of consumer electronic devices, said home server comprising:
  logic for accessing a network service database containing a plurality of service offerings that aggregate capabilities of a plurality of devices;
  logic for receiving a service-centric based request from a user application, that is non-device-specific, based on one or more of said service offerings;
  logic for determining one or more resources of said network for carrying out said service-centric based request from said network service database, wherein said resources include one or more source devices, one or more destination devices and one or more communication links;
  logic for translating said service-centric based request into one or more device-specific events for carrying out said service-centric based request by said resources based on the network service database;
  logic for constructing a service request list that is based on said device-specific events, wherein said service request list is arranged as a hierarchical data structure that includes a top level and one or more lower levels, wherein said top level includes a handle logically associated with said service-centric based request, and descriptive information and timing information for carrying out said service-centric based request, and wherein a lower level includes one or more logical links between said resources, and one or more device-specific commands for carrying out the service-centric based request by said resources;
  logic for determining whether said service request list conflicts with another service request list; and
  logic for storing said service request list if said service request list does not conflict with said another service request list.

14. A home server as recited in claim 13 wherein said service request list further comprises information that describes routing information that allows content from said source devices to be routed to said destination devices through said communication links.

15. A home server as recited in claim 13 further comprising:
  logic for determining availability of said source devices, said destination devices and said communication links at a time said service-centric based request is to be rendered.

16. A home server as recited in claim 14 wherein said content comprises a broadcast program.

17. A home server as recited in claim 13 further comprising logic for denying said service-centric based request provided said service-centric based request is in conflict with said another service-centric based request.

18. A home server as recited in claim 13 further comprising:
  logic for executing said device-specific commands chronologically and sequentially according to said timing information for each of said resources.

* * * * *